United States Patent [19]

Wakai et al.

[11] Patent Number: 4,646,157
[45] Date of Patent: Feb. 24, 1987

[54] POCKET TELEVISION RECEIVERS

[75] Inventors: Yoichi Wakai; Hiroyuki Chihara, both of Suwa, Japan

[73] Assignee: Seiko Epson Kabushiki Kaisha, Japan

[21] Appl. No.: 491,483

[22] Filed: May 4, 1983

[30] Foreign Application Priority Data

May 6, 1982 [JP] Japan .............................. 57-65958[U]

[51] Int. Cl.⁴ .............................................. H04N 7/00
[52] U.S. Cl. ..................................... 358/236; 358/83; 358/241; 358/254
[58] Field of Search ................... 358/236, 230, 83, 93, 358/237, 240, 241, 254; 455/347, 348, 349, 351

[56] References Cited

U.S. PATENT DOCUMENTS 4,079,413  3/1978  Yamashita .............................. 358/83

FOREIGN PATENT DOCUMENTS 1103961  4/1961  Fed. Rep. of Germany ...... 358/237

OTHER PUBLICATIONS

Dick Tracy Comic Strip by Chester Gould, Washington Post, Apr. 26, 1964.
A Pocketable Liquid-Crystal Television Receiver, by Kokado, et al., IEEE Transactions on Consumer Electronics, vol. CE-27, No. 3, Aug. 1981, pp. 462-469.

Primary Examiner—Tommy P. Chin
Attorney, Agent, or Firm—Blum, Kaplan, Friedman, Silberman & Beran

[57]  ABSTRACT

A pocket television receiver comprises a receiver body, including a processor unit for processing the broadcast signals and a power source. The receiver body is sized to fit in a garment pocket. The pocket television receiver also includes an independent display device which can be fitted on the user's wrist. A user can watch the picture image of television easily while walking. The receiver body and the display device are releasably interconnected by cables which also serve as the antenna for receiving broadcast signals. Audio is provided through earphones which connect to the receiver body.

17 Claims, 3 Drawing Figures

POCKET TELEVISION RECEIVERS

BACKGROUND OF THE INVENTION

This invention relates generally to a small television receiver of the type which is readily transportable, for example, in a person's pocket and more particularly to a pocket television receiver having the display attached to the user's wrist. In pocket television receivers of the prior art, the processor unit of the broadcast signal, power source and display device are incorporated into one body. Therefore, such a television set is disadvantageous in that the television unit per se is large and the user must take the receiver out of his pocket each time he watches television reception. It is generally not convenient to watch television while walking.

What is needed is a pocket television receiver which is sized for carrying in the pocket but also allows for convenient use and watching of television, for example, while walking.

SUMMARY OF THE INVENTION

Generally speaking, in accordance with the invention, a pocket television receiver especially suitable for transport in a garment pocket and which readily allows television viewing while walking is provided. The pocket television receiver is broken into two major components, that is, a receiver body, including a processor unit for processing the broadcast signals and also including a power source. The receiver body is sized to fit in a garmet pocket. The pocket television receiver also includes an independent display device which can be fitted, for example, on the user's wrist. A user can watch the picture image of television easily while walking because the display device can be attached to the wrist and is very small and lightweight. A watch can also be incorporated in the display. The receiver body and the display device are releasably interconnected by cables which also serve as the antenna for receiving broadcast signals. Audio is provided through earphones which connect to the receiver body.

Accordingly, it is an object of this invention to provide an improved pocket television receiver which is of small size and weight. Another object of this invention is to provide an improved pocket television receiver which is easily viewed by a user while walking.

A further object of this invention is to provide an improved pocket television receiver which separates a television display device from other elements in the receiver.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
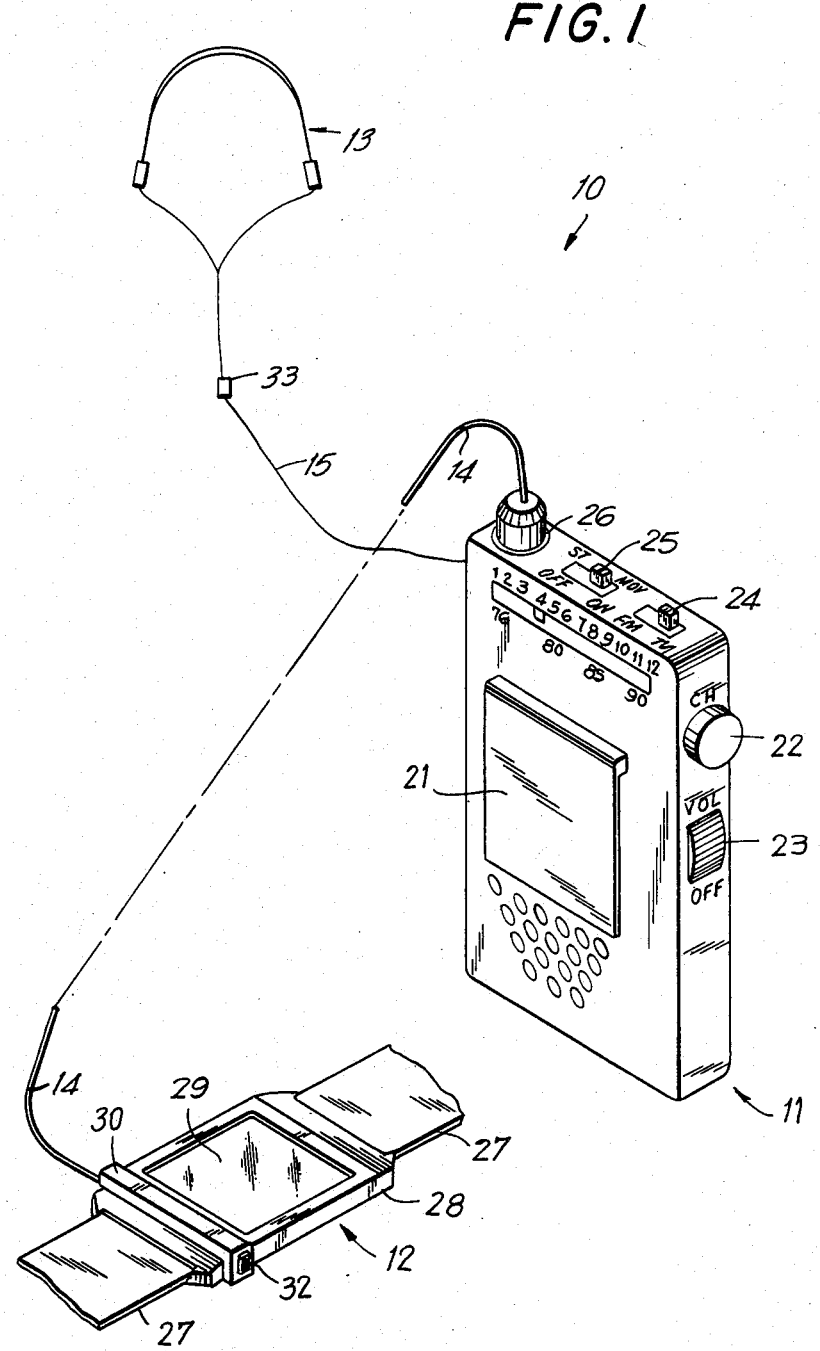
FIG. 1 is a perspective view of a pocket television receiver in accordance with the invention.

FIG. 1 illustrates a pocket television receiver in accordance with the invention, wherein the receiver 10 is comprised of a receiver body 11, display device 12, and a head phone 13. The display device 12 is configured and sized similarly to a wristwatch and is adaptable for attachment on the wrist of a user. The receiver body 11 outputs video signals and sound signals in response to a broadcast wave signal, that is, a conventional radio or television transmission. A clip 21 on the front of the receiver body 11 allow for attachment of the body 11 to a pocket or the belt of a user who carries the pocket television receiver.

Additionally, the receiver body 11 includes a rotary switch 22 for switching television channels and a power source switch 23 on the side of the body 11 which serves not only to turn the internal power supply ON and OFF but also is used as a volume control of the output audio signal. Also included is a selector 24 which is alternatively positioned for reception of television or radio broadcasting signals. An ON/OFF switch 25 is provided for television video and this switch also serves for selecting between either stereo or monaural reception. A video cable jack 26 is positioned on the upper surface (FIG. 1) of the receiver body 11.

The display device 12 has a strap 27 which, like a wristwatch, is fitted to the wrist of the user and also includes a high density dot liquid crystal panel 29 attached to the surface of a central portion of a case 28 of the display device 12. As best illustrated in FIG. 2, input terminals $P_{1'} \ldots P_{5'}$ are provided on one side surface of the display device 12 so as to correspond to electrical pins $P_1 \ldots P_5$ on the connector 30, which pins are individually connected to the electrical wires of the video cable 14.

Figure 2:
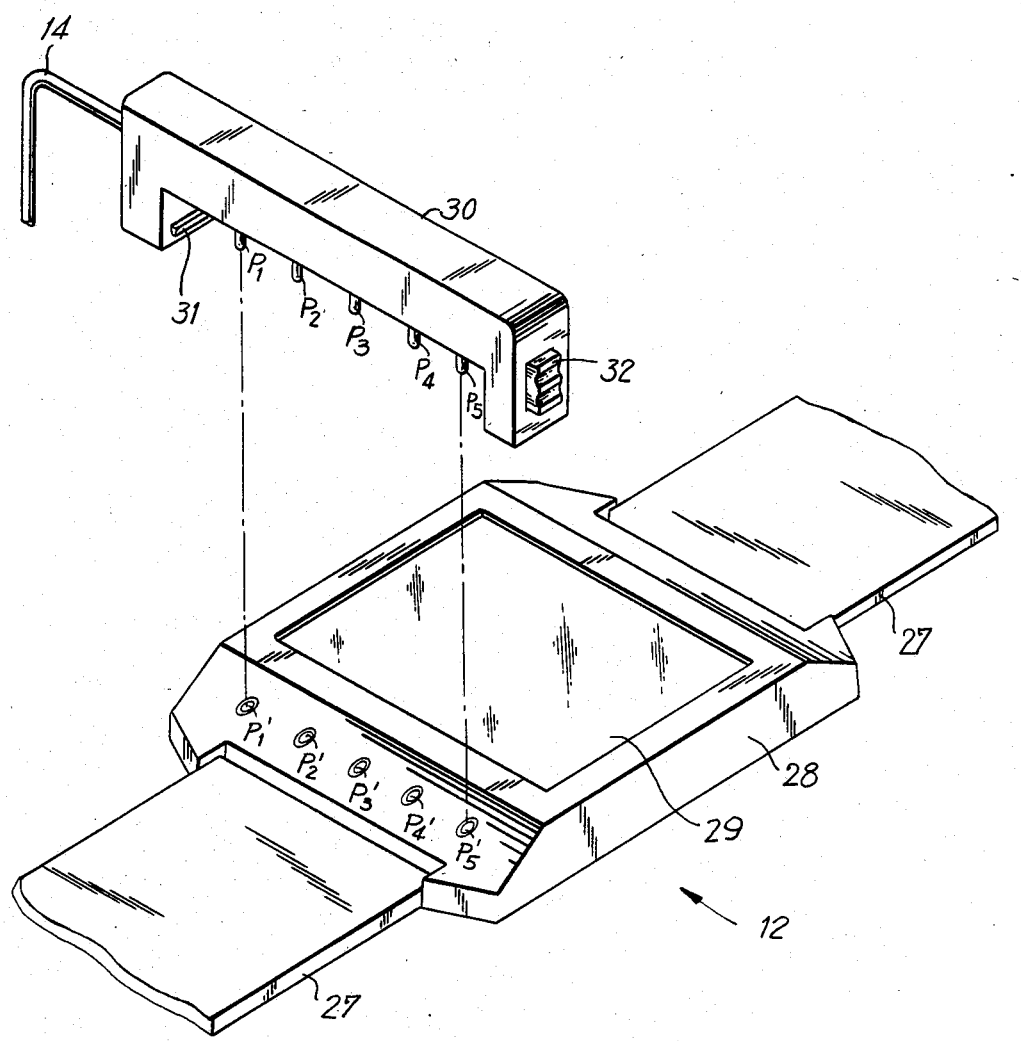
FIG. 2 is an exploded perspective view to an enlarged scale of the display device and connector of FIG. 1.

In FIG. 2, the connector 30 includes a lock pin 31 for connecting to the side of the case 28 which holds the liquid crystal panel 29. A button 32 in the connector 30 actuates the lock pin 31 for releasing the connection between the connector 30 and the case 28. A headphone 13 (FIG. 1) suitable for stereo or monaural connects to the receiver body 11 through a audio cable 15 including a mute switch 33 in circuit. Operation of the mute switch 33 cuts off the sound signal from the receiver body 11 to the headphone 13. The cable 14 carries video signals and electrical power from the receiver body 11 to the display device 12.

Figure 3:
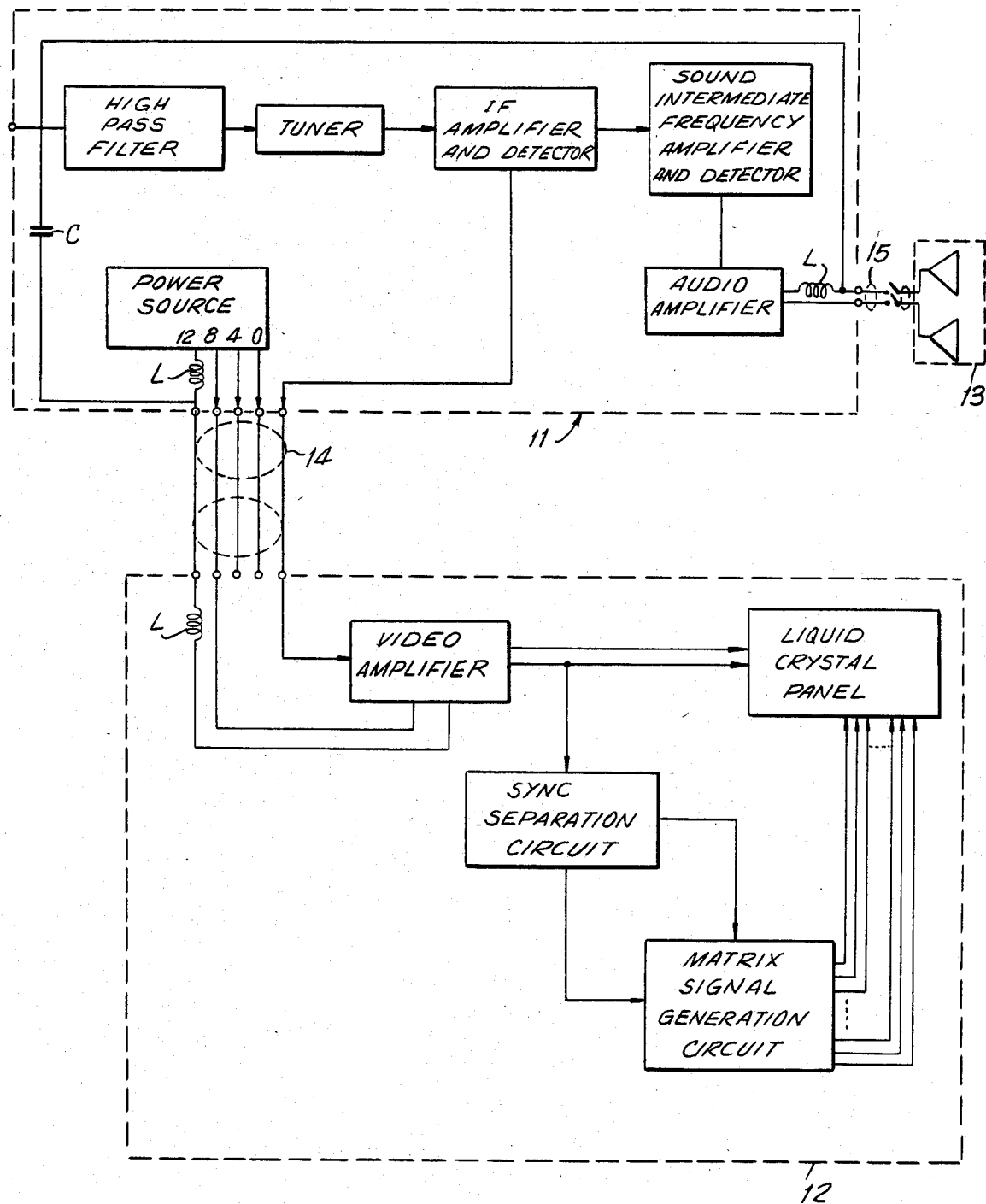
FIG. 3 is a block diagram of a circuit for processing a broadcast signal in a pocket television receiver in accordance with the invention.

FIG. 3 is a circuit block diagram illustrating signal processing in a pocket television receiver in accordance with the invention. The receiver body 11 includes a power source and a processing unit operating on the broadcast signal. In the broadcast signal processing unit, the broadcast wave, picked up in a central wire associated with the voltage supply within the video cable 14 and the sound cable 15, is inputted to a high pass filter in the receiver body 11. The signal from the high pass filter is inputted to a tuner and then to a video intermediate frequency amplifier and detector.

The video signal obtained in the intermediate frequency amplifier and detector is inputted by way of the cable 14 to a video amplifier located in the wrist display device 12. On the other hand, the audio signal is amplified by an audio amplifier after passing through an audio intermediate frequency amplifier and detector.

The power source comprises a battery and a DC-DC convertor which outputs operating voltages of 0, 4, 8 and 12 volts for driving the broadcast signal processing circuits and the wrist display device 12.

The wrist display device 12 is a liquid crystal display device comprising a liquid crystal panel 29 mounted in a case 28. The operating voltages from the power source and the video signal are inputted from the receiver body 11 to the display device 12 by way of the video cable 14. The video signal is amplified by the video amplifier and supplied to the liquid crystal panel 29. A sync separation circuit separates a horizontal synchronizing signal and a vertical synchronizing signal from the video signal and these synchronizing signals are inputted to a matrix signal generation circuit so as to provide matrix signals which are applied to the liquid crystal panel 29 so as to scan the dot pattern in every picture frame in a conventional manner.

Operating procedures for a pocket television receiver in accordance with the invention follow. The wrist display device 12 is put on the wrist and held there by tightening the strap 27 in the conventional manner, as done with a wristwatch. The headphone 13 is set on the head of the user in the conventional manner. The wrist display device 12 and the headphone 13 are connected to the receiver body 11 by the cables 14 and 15, respectively. The selector switch 24 on the receiver body 11, used for selecting between television or radio reception, is switched to the TV position and the TV video ON/OFF switch 25 is placed in the ON position. Then, the switch 23 is rotated to turn on the power and the rotary switch 22 is adjusted to the desired television channel.

When the receiver body 11 is fitted to the user's clothing, by attachment to a waist belt by means of the clip 21 or in a pocket, the video cable 14 and sound cable 15, respectively operate as antennas for catching the broadcast signal, passing the signal through the video and sound signal processing units and inputting signals to the wrist display device 12 and headphone 13 through the video cable 14 and sound cable 15. As a result, television video, which is transmitted to the liquid crystal panel 29 of the wrist display device 12, is visibly displayed and audible sound is provided from the headphone. When listening only to the television sound, the ON/OFF switch 25 of the television is set to the OFF position to stop the functioning of the wrist display device 12. Additionally, the sound can be temporarily interrupted by operating the mute switch 33 in the cable 15.

It should be understood that in alternative embodiments of a pocket television receiver in accordance with the invention a speaker can be provided in the receiver body 11 for use when the pocket television receiver is not being transported or in a quiet environment where the headphone 13 is not necessary.

As stated above in accordance with the invention, it is possible to watch television by putting the receiver body 11 in the user's clothing, that is, a pocket or on a belt, because the television receiver is divided into a receiver body 11, comprising the broadcasting signal processing unit and power source, and also into a separable television video display device. These devices 11, 12, are connected to each other by a cable 14. Moreover, the cable 14 which links the receiver body and the wrist display device is used as an antenna so that clear pictures and strong audio signals with high quality are provided without using an independent antenna. However, it should be understood that in an alternative embodiment in accordance with the invention, a rod antenna can also be used instead of the wire within the cables as described.

It should be understood that broad applications and modifications may be made in accordance with the invention. For example, it is possible to have a calculator function incorporated into the body 11 using the display device 12 for calculator functions. Also, it is possible to have a memory function in the receiver body 11 such that a schedule can be displayed on the wrist display device 12. A ten-key input panel may be provided in association with the calculator and memory functions to provide inputs by the user. Also, as previously stated, a watch can be incorporated providing a display of time on the liquid crystal panel 29.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. A pocket television receiver comprising:
a receiver body, said body including circuits for processing a received broadcast signal and outputting an audio signal and a video signal, and a power source for energizing electrical elements of said pocket television receiver;
a display device including a liquid crystal display panel and driving circuits therefor, said display device being sized to fit on a person's wrist and having a plurality of contact holes on a surface of the display device;
a first electrical cable connecting said receiver body with said display device, the first cable having a first end and a second end, the first end terminating in a connector including connecting pins adapted to engage the plurality of contact holes and locking means for releasably locking the connector pins in the contact holes, said first cable carrying said video signal and a driving voltage from said power source to said liquid crystal display panel and said driving circuits therefor, said liquid crystal display panel visibly displaying the video signal; wherein said display device includes a case, said liquid crystal display panel being mounted to said case, wherein the plurality of contact holes are on a top surface of the display device and the connector is a U-shaped member having two legs and a connecting bar with the legs being adapted to receive the sides of the display device therebetween and the connecting pins extend from the connecting bar substantially parallel to and in substantially the same direction as the legs, the locking means including a mechanical latch for releasably engaging said connector with said case.

2. A pocket television receiver as claimed in claim 1, and further comprising a headphone, said headphone including at least one electro-acoustic output device, said headphone being connected to said receiver body by a second electrical cable, said second cable including signal lines for driving said at least one electro-acoustic device, said electro-accoustic output device audibly outputting the audio signal.

3. A pocket television receiver as claimed in claim 2, wherein said receiver body includes at least one input terminal for receiving broadcast frequency signals, said at least one input terminal being connected to at least one of said signal lines in said second cable supplying said signals for driving said at least one electro-acoustic output device, said at least one signal line serving as an antenna for said pocket television receiver.

4. A pocket television receiver as claimed in claim 1, wherein said display device further includes a case, said liquid crystal display panel being mounted on said case, and a strap connected to said case, said strap being adapted for encircling the wrist of a user and including means for holding said display device to said wrist.

5. A pocket television receiver as claimed in claim 1, wherein said display device includes a case, said liquid crystal display panel being mounted to said case.

6. A television receiver comprising:
a portable receiver body, said body including circuits for processing a received broadcast signal and outputting an audio signal and a video signal;
a display device including a liquid crystal display panel and driving circuits therefor, said display device being sized to fit on a person's wrist and having a plurality of contact holes on a surface of the display device;
a first electrical cable connecting said receiver body with said display device, the first electrical cable having a first end and a second end, the first end terminating in a connector including connector pins adapted to engage the plurality of contact holes and locking means for releasably locking the connector pins in the contact holes, said first cable carrying said video signal to said driving circuits, said liquid crystal display panel visibly displaying the video signal; wherein said display device includes a case, said liquid crystal display panel being mounted to said case, wherein the plurality of contact holes are on a top surface of the display device and the connector is a U-shaped member having two legs and a connecting bar with the legs being adapted to receive the sides of the display device therebetween and the connecting pins extend from the connecting bar substantially parallel to and in substantially the same direction as the legs, the locking means including a mechanical latch for releasably engaging said connector with said case.

7. A television receiver as claimed in claim 6, and further comprising an electro-acoustic transducer, a second electrical cable connecting said electro-acoustic transducer to said receiver body, said second cable including signal lines for driving said electro-acoustic transducer, said electro-acoustic transducer audibly outputting the audio signal.

8. A television receiver as claimed in claim 7, wherein said receiver body includes means coupling said processing circuits and at least one of said first and second cables for transmitting broadcast frequency signals to said processing circuits, a terminal being connected to at least one of said signal lines in said second cable supplying said signals for driving said at least one electro-acoustic transducer, said at least one of said first and second cables serving as an antenna for said television receiver.

9. A television receiver as claimed in claim 7, wherein said second cable is releasably coupled to said receiver body.

10. A television receiver as claimed in claim 7, wherein said processing circuits are adapted to process both television and radio signals.

11. A television receiver as claimed in claim 6, wherein said receiver body is adapted to output audio signals to said electro-acoustic transducer when said display device is disconnected from said first electrical cable by release of said connector.

12. A television receiver as claimed in claim 6, wherein said display device further includes a case, said liquid crystal display panel being mounted on said case, and a strap connected to said case, said strap being adapted for encircling the wrist of a user and including means for holding said display device to said wrist.

13. A television receiver as claimed in claim 6, wherein said display device includes a watch.

14. A television receiver as claimed in claim 6, wherein said receiver body is dimensioned to fit in the pocket of a garment.

15. A television receiver as claimed in claim 6, wherein said processing circuits in said receiver body including a power source, said first cable transmitting a driving voltage from said power source to said display device to drive same.

16. A pocket television receiver as claimed in claim 6, and further comprising a headphone, said headphone including at least one electro-acoustic output device, said headphone being connected to said receiver body by a second electrical cable, said second cable including signal lines for driving said at least one electro-acoustic device, said electro-acoustic device audibly outputting the audio signal.

17. A television receiver as claimed in claim 16, wherein said receiver body is adapted to output audio signals to said headphone when said display device is disconnected from said first electrical cable by release of said connector.

* * * * *